Dec. 10, 1935.  H. A. OTIS  2,023,972
TRANSPORTATION MEANS
Original Filed June 10, 1931
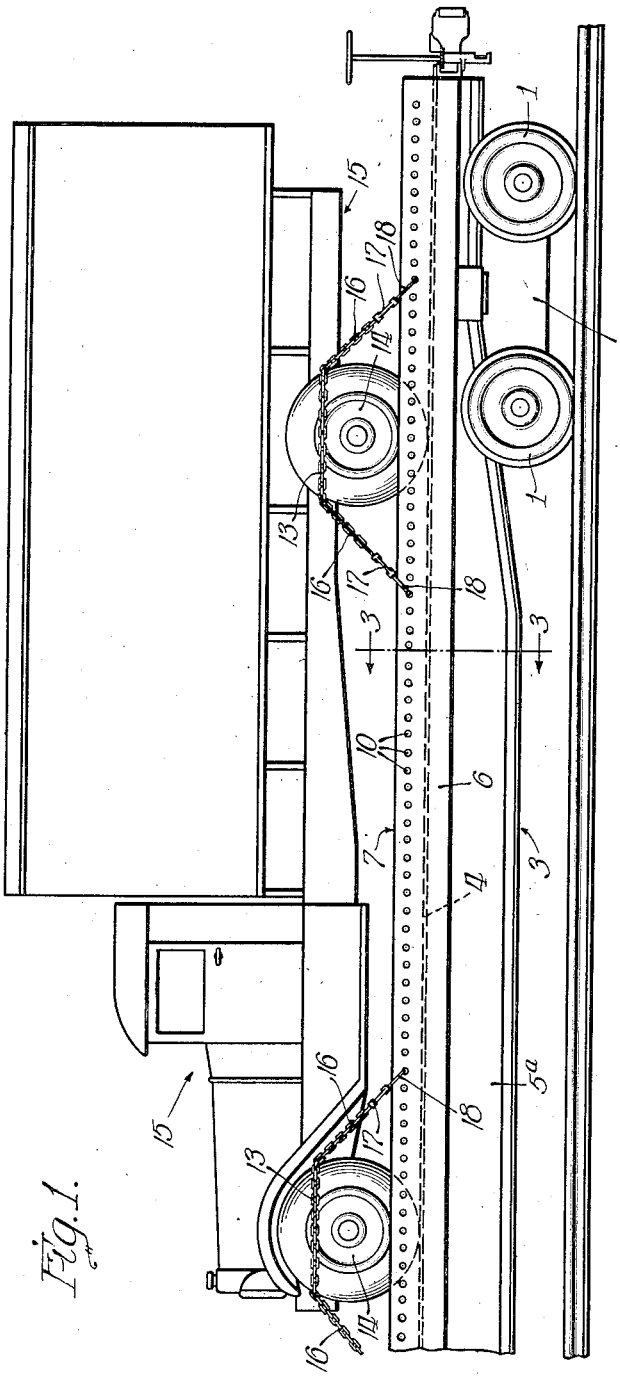
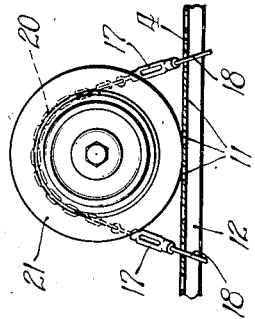
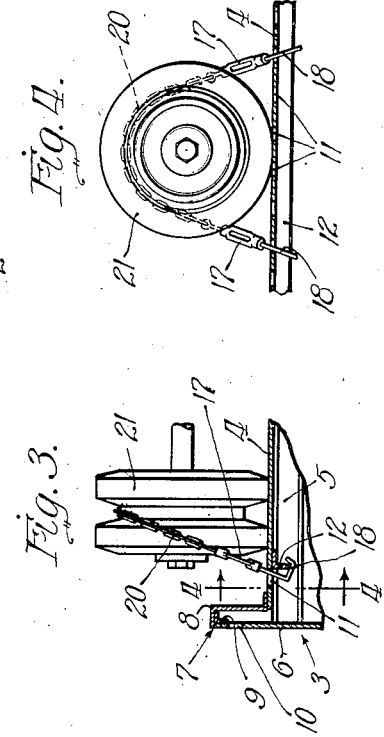
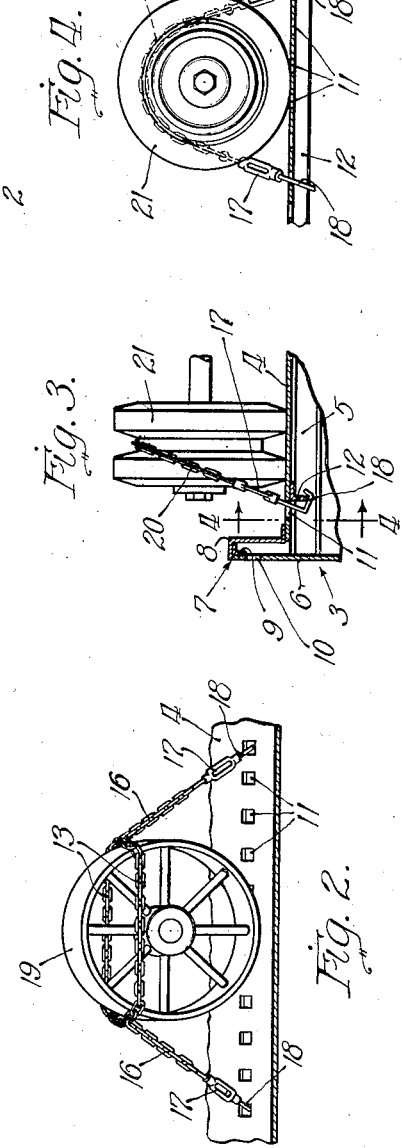
Inventor:
Harold A. Otis Patented Dec. 10, 1935

2,023,972

UNITED STATES PATENT OFFICE 2,023,972

TRANSPORTATION MEANS

Harold A. Otis, Glen Ellyn, Ill., assignor to Chicago, North Shore & Milwaukee Railroad Company, Chicago, Ill., a corporation of Illinois Original application June 10, 1931, Serial No. 543,258. Divided and this application December 11, 1931, Serial No. 580,238

2 Claims. (Cl. 105—159)

My invention relates to transport means and is more particularly concerned with a track vehicle and fastening means associated therewith for anchoring a road vehicle into place upon said track vehicle for shipment thereon.

It is recognized that railroads are efficient and economical in transporting heavy loads at high speeds and at a high degree of safety and certainty in comparison with other means of transportation. On the other hand, road vehicles are advantageous because they may travel almost anywhere and therefore are not restricted to follow definite or fixed lines of travel, as are railroads. Needless to say, road vehicles are also advantageous in cities or towns to make deliveries to one or more destinations, as desirable, such vehicles being particularly adapted for that purpose. Moreover, it is known that in combining the above two forms of transportation, the disadvantages of each form are eliminated and the advantages of both forms are retained.

Moreover, to my knowledge, no railroad car has been devised having suitably adaptable means for conveniently and expeditiously anchoring any type of road vehicle thereon with complete safety.

Fundamentally, the main problem involved is to devise a track vehicle which is particularly adapted for conveying road vehicles and which is provided with economical means for anchoring the road vehicle in fixed position relative to the track vehicle within a short space of time. Initially, a track vehicle of this type should be able to accommodate all kinds of road vehicles so as to have unlimited utility. Furthermore, it should not be required or necessary that the road vehicles be made to carry added equipment or to be specially designed in any way for the purpose of transportation on the track vehicle, it being obvious that if either of the foregoing were necessary, the economy and feasibility of the present invention would be somewhat defeated. Briefly, then, the problem is to suit the track vehicle to the road vehicles without regard as to what type or size the latter may happen to be, and inherently to devise a track vehicle which is capable of having the road vehicles quickly secured thereon and quickly releasable therefrom through adaptable fastening means, whereby loading and unloading of the road vehicles is expeditiously accomplished.

Accordingly, the main object of my invention is to provide a track vehicle, preferably in the form of a flat car, for suitably receiving one or more road vehicles thereon, and which is equipped with suitable means for firmly securing the road vehicles to the bed thereof, the road vehicles being transported with their own wheels resting upon said bed, yet without interfering with the use of the track vehicle as a conventional flat car.

The provision of a means for securing the road vehicles into transportable position in relation to the track vehicle or flat car presents numerous difficulties. For example, the larger road vehicles such as moving vans or the like having exceedingly low bodies, making it difficult for a man to crawl thereunder for attaching a fastening means to the axles or frames thereof. Then again, somewhat smaller vehicles have sufficient room for a man to crawl thereunder to attach suitable fastening means to the frames or axles thereof, but it is apparent that the same means could not be utilized for the larger vehicles for the reasons above noted. Furthermore, the scheme of securing a road vehicle to the bed of a car by providing suitable fastening means for attachment to the frames or axles of the road vehicles is further objectionable for three reasons: First, too much time is required in the process of fastening and unfastening the vehicles to the car bed. Second, the fastening means should not only comprise a mechanism for holding the wheels of a road vehicle against the bed of a car and to prevent fore and aft movement relative thereto, but should also have the capacity to laterally brace the road vehicle to prevent lateral movement thereof relative to the car bed. Third, any fastening means that may be permanently located on the bed of the flat car is apt to interfere with the loading and unloading of the road vehicles onto and off of the flat car, and is also likely to interfere with road vehicles having considerably underslung bodies when the latter are being driven or moved into transportable position on the track vehicle. The means which I have devised to overcome the above related difficulties is universally adapted to anchor any type of road vehicle to the car bed, regardless of the wheel base or tread thereof, and regardless of the type of wheels or tires or of the respective dimensions of the same. The particular means of my construction extends between the wheels of the road vehicle and the flat car substantially externally of the sides of the vehicle, and functions to hold the wheels of the road vehicle firmly against the car to prevent fore and aft movement of the road vehicle and to brace the same laterally to prevent lateral slippage of the vehicle relative to the car, said means being completely adjustable for accommodating all types of road vehicles as will hereinafter appear from the detailed description thereof.

Now, in order to acquaint those skilled in the art with the manner of constructing and operating a device of my invention I shall describe in connection with the accompanying drawing a specific embodiment of the invention.

In the drawing:

Figure 1 is a fragmentary side elevational view of a flat car illustrating the application of my new and novel fastening means as applied to the wheels of a road vehicle to hold the same upon the flat car;

Figure 2 is a perspective view of the fastening means as applied to a different type of road vehicle wheel from that illustrated in Figure 1;

Figure 3 is a vertical cross sectional view taken substantially along the line 3—3 of Figure 1 and illustrating another form of fastening means particularly applicable for use in connection with another well known type of vehicle wheel; and Figure 4 is a cross sectional view taken substantially in the plane of the line 4—4 of Figure 3.

The flat car and fastening means herein disclosed and described are devised for the same purpose as the construction shown in my copending application filed June 10, 1931, bearing the Serial No. 543,258, the subject matter of the present application being a division of the aforesaid application.

The car generally comprises track wheels 1 embodied in a suitable truck 2 which may be of standard or preferred design, the wheels thereof being adapted to run upon the rails of a railroad. The wheels, trucks and rails may be of standard design and standard gauge, or of any preferred construction and gauge. The main body 3 of the car is suitably mounted upon the truck through pivotal connections, such as are well understood by those skilled in the art and which form in themselves no novel feature of the present invention. The body 3 includes a bed or platform 4 adapted as a runway for the road vehicles. The bed may be of any suitable construction but is preferably steel boiler plate secured by welding, riveting or bolting to suitable transverse channels 5 carried by one or more central girders 5a.

A pair of vertical longitudinally disposed plates 6 are suitably secured to the sides of the body. These plates project considerably above the surface of the bed plates 4 and constitute a part of the longitudinally extending wheel guards 7 which function to prevent the road vehicles from accidentally rolling off of the car when loading and unloading the same therefrom. The balance of each guard structure is composed of a Z-iron 8 which constitutes a reinforcing tie between the plates 4 and 6, and provides the inner wall of the guard 7. Angle irons 9 likewise extend longitudinally of the car and serve as joining elements between the Z-irons 8 and the plates 6 and are also provided for another purpose to be hereinafter described. It is to be understood that all of the aforesaid elements may be securely fastened in any desired manner, and although welding may be preferable, rivets or bolts will serve for the same purpose.

Referring more particularly to Figures 1 and 3, it is to be noted that the side plates 6 are provided with a plurality of perforations 10 throughout their length, the perforations being so located therein as to clear the bottom edges of the vertical legs of the angle irons 9. Likewise, the bed of the car is also provided with a plurality of perforations 11 disposed substantially along the longitudinal margins of the bed and also throughout the length of the car as best illustrated in Figures 2 and 3. The perforations 10 and 11 may be of any suitable size or shape so as to comply with various conditions and uses, and may be located and spaced in any desirable predetermined manner to form attachment means to receive means for securing a road vehicle in place. The bed is further provided with angle irons 12 secured to the underside thereof, the angles extending longitudinally of the car and adjacent the perforations 11 as best indicated in Figure 3, the purpose of which being hereinafter explained.

All of the foregoing description relates directly to the construction of the railroad car per se and the car portrayed thereby is, as it stands, capable of receiving and accommodating not only ordinary loads but is particularly devised for the reception of various types of cooperating fastening devices to secure road vehicles to the bed of the car in transportable position, a preferred form of such a fastening device being hereinafter described in detail.

The fastening means of the present invention is so constructed that it can be universally employed in connection with any type of vehicle wheel. A preferred form thereof is shown in Figure 2 and includes a loop 13 which is indicated as a chain but which may be of any other flexible construction. The chain loop is adapted to horizontally straddle or embrace a wheel 14 of any vehicle 15. A pair of attachment members 16 are suitably connected at opposite ends of the chain loop 13 by direct connection therewith as shown, or they may be connected by means of slip rings if so desired. The other ends of the attachment members are each provided with tensioning devices such as turnbuckles 17. Each turnbuckle is provided with a threaded shank connected with or formed into a hook 18, the purpose of the latter being to secure the attachment members to the car by insertion into any of the perforations 10 or 11 as the case may be. It is also obvious and within the purview of the present invention to make the chain loop 13 adjustable if desired, as by means of incorporating a turnbuckle or turnbuckles such as 17 within the length thereof.

To anchor a road vehicle upon the car, the chain loop is merely dropped upon the wheel and the hooks 18 of the attachment members inserted into certain selected perforations in the guard rail or bed of the car. When vehicles of larger tread sizes are being transported, the hooks will ordinarily be inserted through the guard rail perforations, while with vehicles of smaller tread sizes the bed perforations will more generally be employed for the reception of the hooks. But in all cases, it will be desirable to connect the attachment members between the chain loop and the bed so that they will be inclined downwardly and outwardly to guard as much as possible against lateral slippage of the vehicles being transported upon the flat car.

The universal adaptability of the fastening device to various types of wheels is clearly apparent, and to illustrate by way of example a further use thereof aside from that in which the device is portrayed in Figure 1, the device has been shown in Figure 2 as being utilized in connection with a wheel 19 of a general class of wheels such as are associated with agricultural implements, tractors, road scrapers, etc. Not only is the device of universal utility, but it is also extremely convenient and may be expeditiously put into place on a wheel and removed therefrom. In both Figures 1 and 2, it will be observed that the loop 13 contacts with the circumference of the wheel at two points spaced fore and aft of the axle, the ends of the attachment members 16 being connected with the car at two points spaced fore and aft of the wheel.

Another form of the hereinbefore described fastening means is shown in Figures 3 and 4. Here the loop has been omitted and the attachment members are joined to form one continuous loop or bight 20 having the turn-buckles 17 and hooks 18 secured to the ends thereof. This construction is particularly applicable to double rimmed wheels of the double tired type as indicated generally at 21. In securing a wheel of the latter construction to the bed of a car, the fastening device is merely trained longitudinally over the periphery of the wheel within the peripheral gorge formed between the tires or rims thereof, and the hooks are inserted into certain perforations of the car. The fastening means is then tensioned as desired by means of the turn-buckles 17.

It is further to be noted that in securing either of the foregoing constructions to the bed or guard rail of the car, that the hooks 18 have been so shaped or constructed as to be insertable through the perforations 10 or 11 to such an extent that they will encounter either of the vertically disposed legs of the longitudinally extending angle irons 9 or 12, respectively. In this manner the car bed and the guards are reinforced, and tearing of the metal comprising the latter elements will be substantially eliminated.

It is apparent that changes may be made in the specific structural elements constituting the herein described fastening means which will not depart from the field and scope of the present invention. Therefore, I do not intend to be strictly limited to the specific description and illustrations of the preferred devices, but only insofar as the appended claims are so limited.

What I claim is:—

1. In combination, a track vehicle, a wheeled road vehicle mounted on the track vehicle and having double rimmed wheels, a flexible member disposed between the rims of one of said wheels and extending over said wheel above the center and below the top thereof, the end portions of said member extending across the tread of the wheel at the front and the back thereof in contact therewith, and means for securing the ends of said member to the track vehicle outwardly beyond said wheel and under tension exerted downward and outward of the wheel for holding the latter by tension against forward, rearward, inward and upward movements relative to the track vehicle.

2. In combination, a track vehicle, a wheeled road vehicle on the track vehicle and having double rimmed and double tired wheels, a flexible member disposed between the rims of one of said wheels and extending over said rims of the wheel above the center and below the top of the tires thereof, the end portions of said member extending outward across the tread of the wheel at the front and the back thereof in contact therewith, and means for securing the ends of said member to the track vehicle outwardly beyond said wheel and under tension exerted downward and outward of the wheel.

HAROLD A. OTIS.